(12) United States Patent
Bartlett

(10) Patent No.: US 6,591,869 B2
(45) Date of Patent: Jul. 15, 2003

(54) MULTIPORT GATE VALVE ASSEMBLY

(75) Inventor: Christopher D. Bartlett, Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 10/155,099

(22) Filed: May 24, 2002

(65) Prior Publication Data

US 2002/0139422 A1 Oct. 3, 2002

Related U.S. Application Data

(63) Continuation of application No. 09/815,395, filed on Mar. 22, 2001, now Pat. No. 6,453,944.
(60) Provisional application No. 60/192,124, filed on Mar. 24, 2000.

(51) Int. Cl.[7] .............................................. F16K 11/044
(52) U.S. Cl. ................... 137/601.13; 166/319; 251/328
(58) Field of Search ....................... 137/601.01, 601.13, 137/601.14, 601.15, 625.33, 625.37, 15.23, 15.29, 15.3, 315.3, 315.31, 315.32; 251/328; 166/319, 320, 321

(56) References Cited

U.S. PATENT DOCUMENTS

| | | | | | |
|---|---|---|---|---|---|
| 2,182,724 | A | * | 12/1939 | Hennessy | ............. 137/601.05 |
| 2,485,504 | A | * | 10/1949 | Morgan | ....................... 251/324 |
| 2,713,989 | A | * | 7/1955 | Bryant | ........................ 251/324 |
| 3,249,117 | A | * | 5/1966 | Edwarde | ................. 137/315.3 |
| 3,951,381 | A | * | 4/1976 | Whitener | ..................... 251/356 |
| 4,444,006 | A | * | 4/1984 | Burkes et al. | ................. 60/251 |
| 4,494,571 | A | * | 1/1985 | Seegers et al. | ........ 137/596.16 |
| 4,801,265 | A | * | 1/1989 | Kratochwilla | ................ 433/98 |
| 5,230,367 | A | * | 7/1993 | Minch | .................. 137/625.28 |

FOREIGN PATENT DOCUMENTS

| | | | |
|---|---|---|---|
| GB | 1204072 | * | 9/1970 |
| GB | 2047773 | * | 12/1980 |
| WO | 00/45030 | * | 8/2000 |

* cited by examiner

Primary Examiner—Stephen M. Hepperle
(74) Attorney, Agent, or Firm—Henry C. Query, Jr.

(57) ABSTRACT

The invention is directed to a gate valve assembly which comprises an elongated body having a longitudinal bore extending therethrough; a plurality of gates slidably disposed in the longitudinal bore across respective flow passages which each extend laterally through the body between corresponding inlet and outlet ports; each gate being movable between an open position wherein an opening in the gate is aligned with its respective flow passage and a closed position wherein the opening is offset from its respective flow passage; and an actuator for moving the gates simultaneously between a first position, wherein at least one of the gates is in its open position, and a second position, wherein the at least one gate is in its closed position.

5 Claims, 5 Drawing Sheets

MULTIPORT GATE VALVE ASSEMBLY

This application is a continuation of U.S. patent application Ser. No. 09/815,395 filed on Mar. 22, 2001, now U.S. Pat. No. 6,453,944, which is based on U.S. Provisional Patent Application No. 60/192,124 filed on Mar. 24, 2000.

BACKGROUND OF THE INVENTION

The present invention relates to a gate valve. More particularly, the invention relates to a gate valve which comprises a plurality of flow paths extending between respective inlet and outlet ports and a gate member for controlling the flow of fluid through each of the flow paths.

The need to control the flow of fluid through multiple flow paths exists in many applications. One such application is a flow completion system for producing oil or gas from a subsea well. A typical horizontal-type flow completion system comprises a wellhead housing which is installed at the upper end of a well bore, a tubing spool which is connected to the top of the wellhead housing, and a tubing hanger which is suspended in the tubing spool. In addition to supporting at least one tubing string which extends into the well bore, the tubing hanger may also comprise several service and control conduits for communicating hydraulic control fluid or chemicals to corresponding devices or positions located in the well bore below the tubing hanger. These service and control conduits are connected to corresponding external service and control lines typically via radial penetrators which extend through the tubing spool and into the tubing hanger. In order to ensure that the service and control conduits do not permit well fluids to escape into the environment, each service and control conduit typically must include a closure member to seal off the service and control conduit when it is not in use.

In prior art flow completion systems, a poppet-type valve is usually installed in the end of each service and control conduit adjacent the radial penetrator to seal off the service and control conduit when it is disengaged from the radial penetrator. While this poppet-type valve is sufficient to provide a single barrier between the well bore and the environment through the service and control conduit, industry standards often require that such conduits include two barriers. Although a second barrier may be achieved by providing a second valve in each service and control conduit, such valves would each require a separate actuating mechanism comprising a separate set of control lines, and this would necessarily increases the cost and complexity of the flow completion system.

SUMMARY OF THE PRESENT INVENTION

In accordance with the present invention, these and other disadvantages are overcome with a multiport gate valve assembly which comprises an elongated body having a longitudinal bore extending therethrough, a plurality of gates slidably disposed in the longitudinal bore across respective flow passages that each extend laterally through the body between corresponding inlet and outlet ports, and an actuator for moving the gates simultaneously between their respective open position, wherein an opening in each gate is aligned with its corresponding flow passage, and a closed position, wherein the opening is offset from its flow passage. Thus, the gate valve assembly of the present invention is capable of simultaneously controlling the flow of fluid through several different flow passages.

In a preferred embodiment of the invention, the body comprises first and second spaced apart entrance bores and the longitudinal bore extends substantially between the first and second entrance bores. In addition, the actuator comprises a first piston which is disposed in the longitudinal bore between the first entrance bore and the gates, a second piston which is disposed in the longitudinal bore between the second entrance bore and the gates, and a source of hydraulic fluid which is connected to each of the first and second entrance bores. Thus, application of hydraulic fluid to either the first or the second entrance bore will move the gates simultaneously between their respective open and closed positions.

In this manner, the multiport gate valve assembly of the present invention provides a simple and effective means for controlling the flow of fluid through a plurality of individual flow paths. When used in conjunction with a flow completion system, the inlet ports may be connected to the service and control conduits which extend through the tubing hanger and the exit ports may be connected to corresponding devices or positions located below the tubing hanger. Thus, the multiport gate valve assembly can provide a second barrier between the well bore and the environment through the service and control conduits without the need for individual valves in each conduit.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
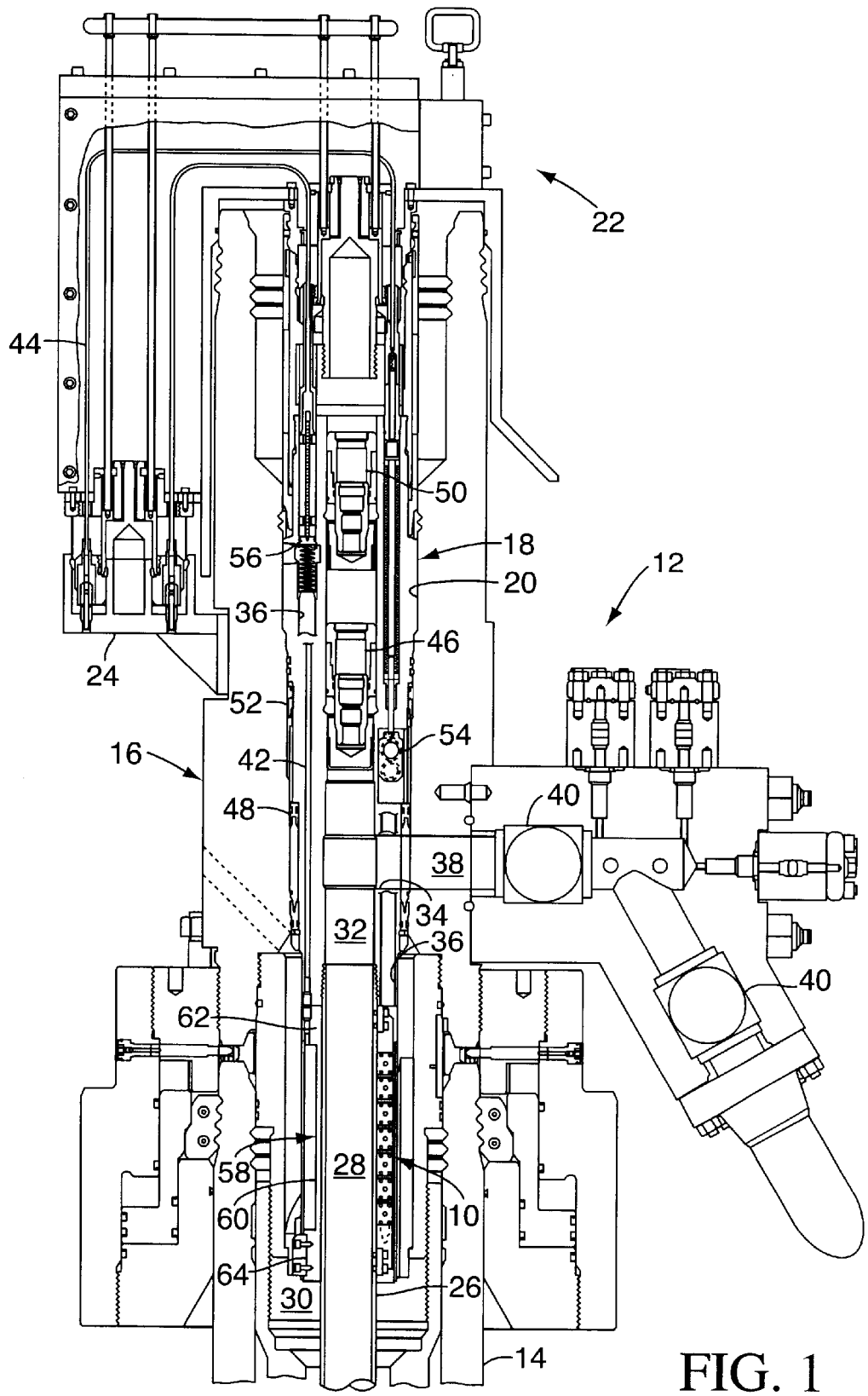
FIG. 1 is a diagrammatic representation of an exemplary flow completion system showing the multiport gate valve assembly of the present invention installed on the tubing hanger component of the system.

Referring to FIG. 1, a preferred embodiment of a multiport gate valve assembly 10 is shown installed on an exemplary flow completion system 12. As explained more fully in applicants' co-pending U.S. patent application Ser. No. 09/815,437, which was filed on Mar. 22, 2001 and is hereby incorporated herein by reference, the flow completion system 12 comprises a wellhead housing 14 which is installed at the top of a well bore (not shown), a tubing spool 16 which is connected to the top of the wellhead housing 14, a generally annular tubing hanger 18 which is landed in a central bore 20 that extends axially through the tubing spool 16, and a controls bridge 22 which is connected between the top of the tubing hanger 18 and a junction plate 24 that is mounted on the tubing spool 16. The tubing hanger 18 supports at least one tubing string 26 that extends into the well bore and defines a production bore 28 within the tubing string and a tubing annulus 30 surrounding the tubing string. In addition, the tubing hanger 18 includes a concentric production bore 32 which communicates with the tubing string production bore 28, a lateral production passageway 34 which extends between the production bore 32 and the outer diameter of the tubing hanger, and an annulus bore 36 which extends between the tubing annulus 30 and a portion of the central bore 20 located above the tubing hanger. Furthermore, the tubing spool 16 comprises a production outlet 38 which communicates with the production passageway 34, and the flow completion system 12 includes one or more valves 40 for controlling flow through the production outlet 38.

In the embodiment of the flow completion system 12 depicted in FIG. 1, the tubing hanger 18 also comprises a number of service and control conduits 42 which extend between the tubing annulus 30 and either the top or the outer diameter of the tubing hanger. The service and control conduits 42 provide for communication of fluids through the tubing hanger between corresponding external service and control lines (not shown) and devices or positions located below the tubing hanger. For example, one or more service and control conduits 42 may communicate hydraulic control fluid from a controls pod to an operational device, such as a surface controlled subsea safety valve (not shown), which is located in the tubing string production bore 28. Also, one or more service and control conduits 42 may communicate pressure from the tubing annulus 30 to an external service and control line which is connected to a pressure monitoring device located, for instance, on a surface vessel.

Each service and control conduit 42 is removably connected to its corresponding external service and control line through either a conventional radial penetrator (not shown) or the controls bridge 22. In order to facilitate this connection, a first fluid coupling member which comprises a poppet-type valve is preferably mounted in the end of the service and control conduit 42 which is adjacent the radial penetrator or the controls bridge. The radial penetrator may comprise a second coupling member that is movably mounted in the tubing spool 16 and which is adapted to sealingly engage the first coupling member. The service and control conduit 42 may be coupled to an external service and control line which is connected to the radial penetrator by actuating the radial penetrator to bring the second coupling member into engagement with the first coupling member, as is well understood by those skilled in the art. Alternatively, the controls bridge 22 may comprise a bridge line 44 having one end connected to a third coupling member which is adapted to sealing engage the first coupling member and a second end connected to a fourth coupling member which is adapted to sealingly engage a fifth coupling member mounted on the junction plate 24. The service and control conduit 42 may be coupled to an external service and control line which is connected to the fifth coupling member by actuating a connection mechanism in the controls bridge to bring the third coupling member into engagement with the first coupling member and to bring the fourth coupling member into engagement with the fifth coupling member. Further details of the controls bridge 22 may be found in applicants' co-pending U.S. Pat. application Ser. No. 09/815,431, which was filed on Mar. 22, 2001 and is hereby incorporated herein by reference.

In the production mode of operation of the embodiment of the flow completion system 12 shown in FIG. 1, the tubing hanger 18 preferably supports both of the industry required first and second barriers between the well bore and the environment, thus eliminating the need for a separate pressure sealing tree cap. The first barrier is provided by a suitable first closure member 46, such as a wireline crown plug, which is disposed in the production bore 32 above the production passageway 34, and a first annular, preferably metal seal 48 which is positioned between the tubing hanger 18 and the tubing spool 16 above the production passageway 34. Similarly, the second barrier is provided by a suitable second closure member 50, such as a wireline crown plug, which is mounted in the production bore 32 above the first closure member 46, and a second annular, preferably metal seal 52 which is positioned between the tubing hanger and the tubing spool above the first seal 48. In addition, the annulus bore 36 is sealed by both a first closure member 54, such as a remotely operable gate valve, and a second closure member 56, such as a sting open check valve. Furthermore, while a first barrier for each service and control conduit 42 is provided by the first coupling member which is mounted in the service and controls conduit adjacent the radial penetrator or the controls bridge, the second barrier is preferably provided by the multiport gate valve assembly 10.

When used to control fluid flow through the service and control conduits 42, the gate valve assembly 10 is preferably supported on the tubing hanger 18. More particularly, in the exemplary flow completion system shown in FIG. 1, the gate valve assembly 10 is connected to a lower extension member or orienting sub 58 which is secured to the bottom of the tubing hanger 18. The orienting sub 58 comprises a tubular span 60 having an internal bore which is concentric with the tubing string 26, and first and second flanges 62, 64 extending radially outwardly from opposite ends of the span 60. The extension member 58 is precisely oriented with respect to the tubing hanger 18 via one or more alignment pins (not shown), and is secured thereto by any suitable means, such as a plurality of bolts (not shown) that extend through the first or upper flange 62 and into the bottom of the tubing hanger.

Figure 2:
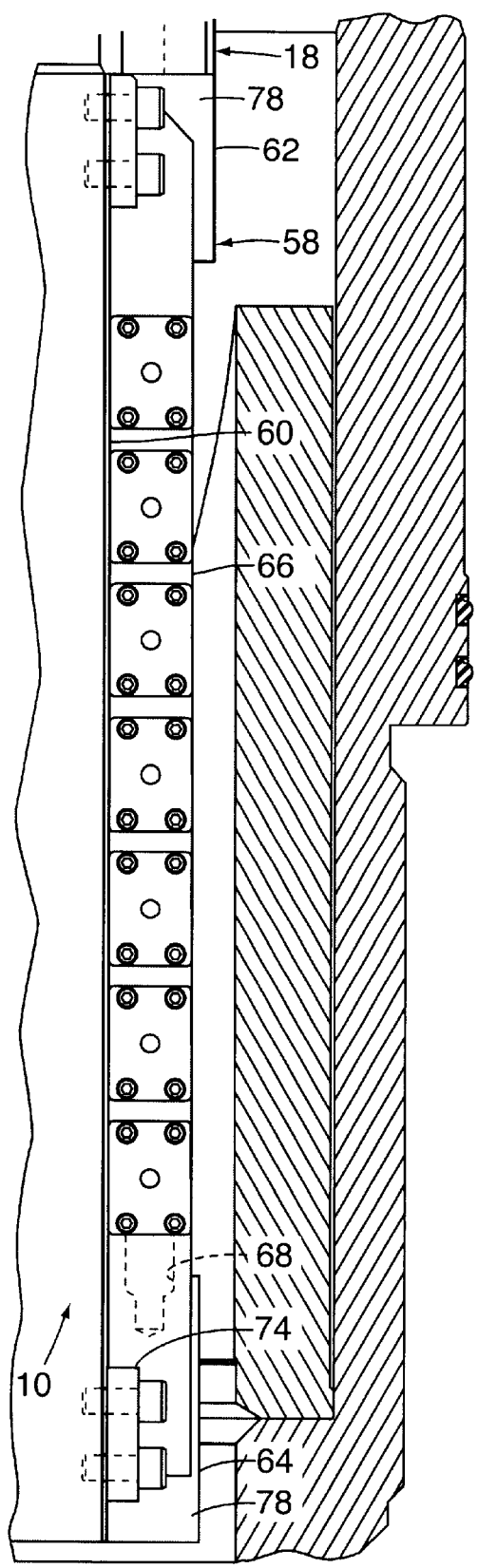
FIG. 2 is an enlarged elevational view of the multiport gate valve assembly depicted in FIG. 1.
Figure 3:
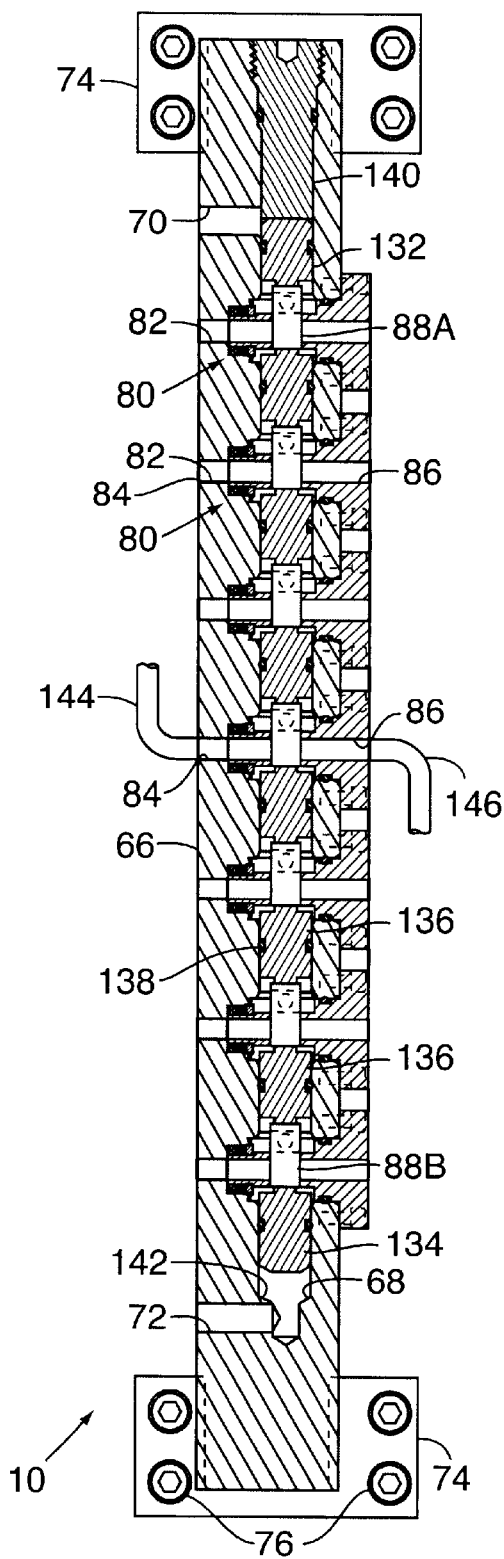
FIG. 3 is a longitudinal cross-sectional view of the multiport gate valve assembly depicted in FIG. 2.
Figure 4:
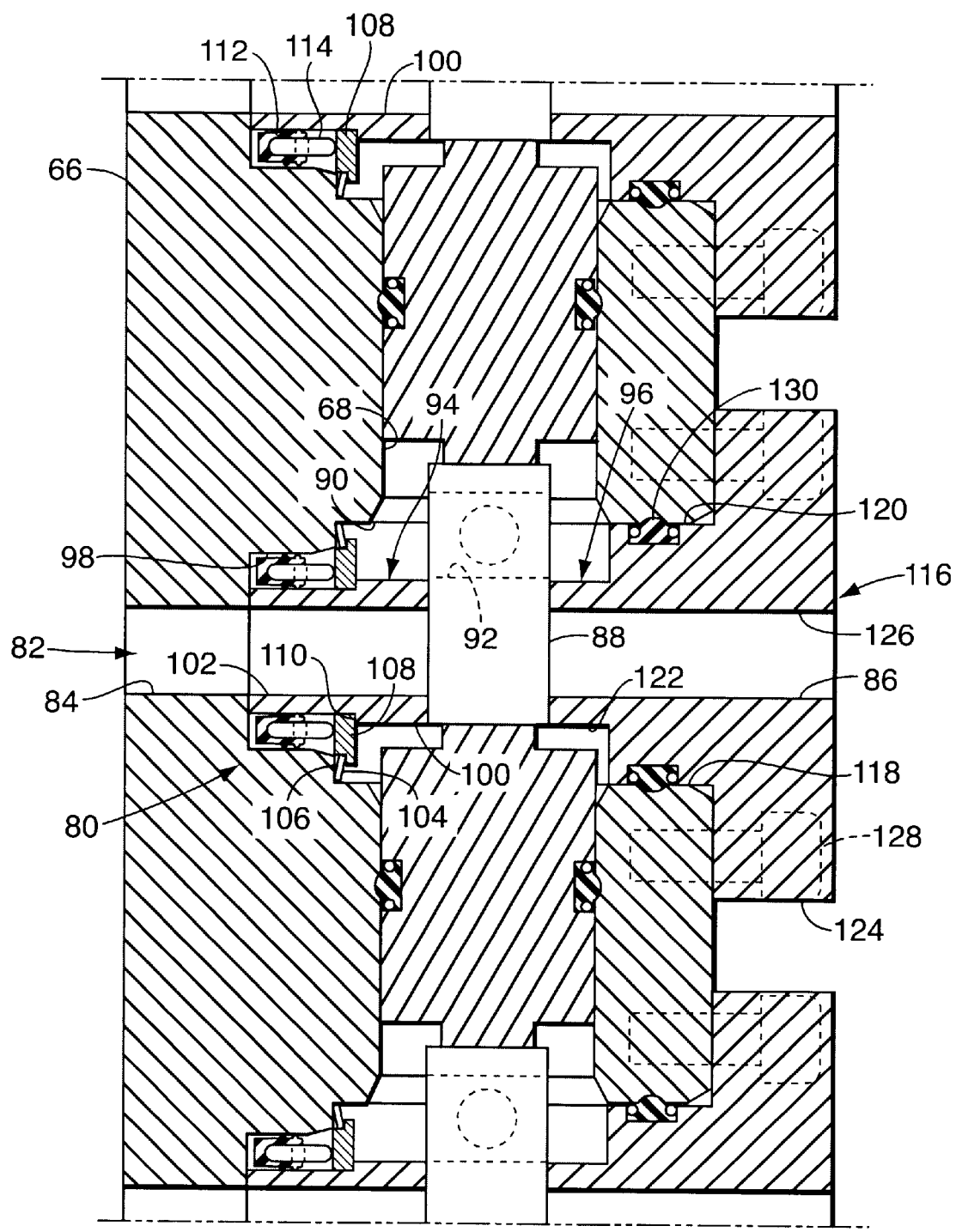
FIG. 4 is an enlarged cross-sectional view of a portion of the multiport gate valve assembly depicted in FIG. 3.

Referring to FIGS. 2 through 4, the multiport gate valve assembly 10 is shown to comprise an elongated body 66 having a longitudinal bore 68 extending therethrough between a first entrance bore 70 and a second entrance bore 72. The body 66 is preferably attached to the orienting sub 58 using a pair of brackets 74, which may either trap the body or be attached thereto by, for example, welding. The brackets 74 are in turn connected to the orienting sub 58 by bolts 76 or other suitable means to thereby firmly secure the gate valve assembly 10 to the tubing hanger 18. If necessary, appropriate cutouts 78 may be made in the first and second flanges 62, 64 of the orienting sub 58 to accommodate the brackets 74 and thereby allow the body 66 to be mounted tightly against the span 60.

The gate valve assembly 10 in effect comprises a plurality of individual gate valves 80 which are housed within the body 66. Each gate valve 80 operates to open or close a corresponding flow passage 82 which extends transversely through the body 66 from an inlet port 84 to an outlet port 86. As shown more clearly in FIG. 4, each gate valve 80 comprises a gate 88 which is positioned in a cavity formed by the intersection of the longitudinal bore 68 with a transverse bore 90 that is formed in the body 66. The gate 88, which includes an opening 92 extending therethrough, is reciprocatable between first and second annular seats 94, 96 to either open the gate valve 80, wherein the opening 92 is aligned with the flow passage 82, or close the gate valve 80, wherein the opening 92 is offset from the flow passage 82, as shown in FIG. 4.

The first seat 94 is received in a seat pocket 98 which is formed in the body 66 between the transverse bore 90 and the inlet port 84. The first seat 94 is preferably a floating seat which comprises a stepped, generally cylindrical outer wall 100 and a coaxial through bore 102 that aligns with the inlet port 84. A Belleville washer 104 or similar biasing means is positioned on a step 106 which is formed between the transverse bore 90 and the seat pocket 98. The Belleville washer 104 engages a biasing ring 108 which is mounted behind a shoulder 110 formed on the outer wall 100 to urge the first seat 94 against the gate 88. A seal ring 112 is disposed in the seat pocket 98 around the outer wall 100 to form a pressure-tight seal between the first seat 94 and the body 66. In addition, a support ring 114 is preferably positioned between the seal ring 112 and the biasing ring 108 to maintain the seal ring properly positioned within the seat pocket 98.

The second seat 96 preferably forms part of a plug member 116 which is employed to seal an opening 118 that the transverse bore 90 makes in the body 66. The plug member 116 includes a circular body portion 120 which is received in the opening 118, a reduced diameter portion 122 which extends axially toward the gate 88 and defines the seat 96, a back plate 124 which is attached to or formed integrally with the body portion 120 opposite the reduced diameter portion 122, and an axial through bore 126 which aligns with the through bore 102 in the first seat 94 and defines the outlet port 86 of the gate valve 80. The plug member 116 is optimally removably connected to the body 66 with a number of bolts 128, and a seal ring 130 may be positioned around the body portion 120 to ensure a pressure-tight seal between the plug member 116 and the body 66.

Referring again to FIG. 3, the gate valve assembly 10 also comprises a first actuating piston 132 positioned between the first entrance bore 70 and the uppermost gate 88A, a second actuating piston 134 positioned between the second entrance bore 72 and the lowermost gate 88B, and an annular spacer piston 136 engaged between each pair of successive gates 88. Each of the pistons 132–136 supports an annular seal 138, such as an S-type radial interference or other preferably non-metallic seal, for sealing between the piston and the longitudinal bore 68. The pistons 132–136 and the gates 88 together form a column which is preferably manufactured as an integral unit from a single metal bar. Alternatively, the pistons 132–136 and the gates 88 may be manufactured as individual pieces and then assembled into a column within the body 66. In either case, the column is actuated as a unit between the open position, wherein the openings 92 in the gates 88 are aligned with their respective flow passages 82, and the closed position shown in FIG. 3, wherein the openings 92 are offset from their flow passages 82. In the closed position, the top of the first actuating piston 132 engages the bottom of an access plug 140 which is secured and sealed in the top of the longitudinal bore 66 by suitable means. In the open position (not shown), the bottom of the second actuating piston 134 engages a ring-shaped stop 142 formed by a reduced diameter portion of the longitudinal bore 68 above the second entrance bore 72.

The inlet port 84 of each gate valve 88 is connected to a corresponding service and control conduit 42 by a first tubular conduit 144, which is either welded to the body 66 at the inlet port 84 or secured to the inlet port with an appropriate fitting. In addition, the outlet port 86 may be connected to a corresponding downhole component or location by a second tubular conduit 146, which is connected to the plug member 116 by means similar to that used to connect the first conduit 144 to the body 66.

In operation of the multiport gate valve assembly 10 depicted in FIG. 3, the gates 88 are normally in either the open or the closed position. If the gates 88 are in the open position and it is desired to close the service and control conduits 42, hydraulic fluid from an external control line (not shown) is introduced into the second entrance bore 72. The pressure from the hydraulic fluid will force the second actuating piston 134 upward and thus move the entire column of pistons and gates upward into the closed position depicted in FIG. 3. When it is desired to return the gate valve assembly 10 to the open position, hydraulic fluid from an external control line (not shown) is introduced into the first entrance bore 70. The pressure from the hydraulic fluid will force the first actuating piston 132 downward and thus move the entire column of pistons and gates downward into the open position.

Although not depicted in the drawings, one or more of the gates 88 may be oriented such that its open and closed position is out of phase with those of the other gates in the gate valve assembly 10. That is, in a first position of the column, one or more gates 88 may have their openings 92 aligned with their corresponding flow passages 82 while the other gates have their openings offset from their corresponding flow passages. When the column is shifted to the second position, the first set of gates will close their flow passages and the second set of gates will open their flow passages. This allows for a first set of service and control conduits to be opened while a second set is closed, and then for the first set to be closed while the second set is opened.

Figure 6:
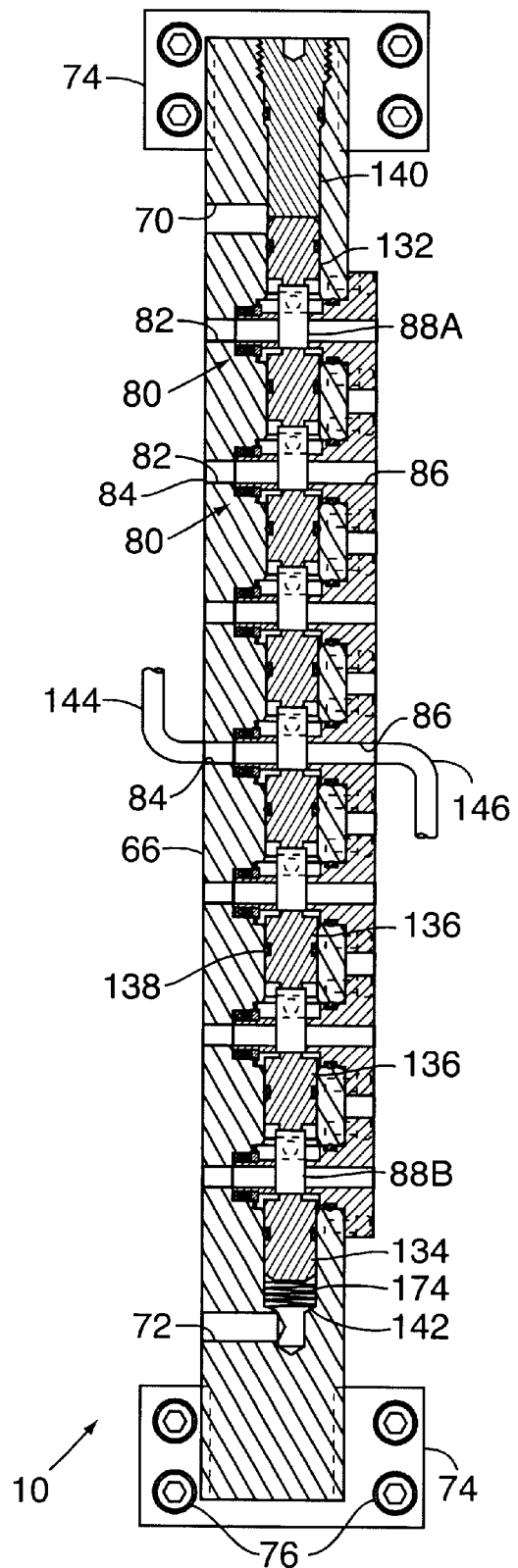
FIG. 6 is a longitudinal cross section view of another embodiment of the multiport gate valve assembly of the present invention.

Also, it should be understood that, while the multiport gate valve assembly 10 has been illustrated in conjunction with a particular means for moving the gates 88 between their respective open and closed positions, other means may be employed for this same purpose. Referring to FIG. 6, for example, a mechanical biasing means, such as a compression spring 174, may be positioned in the longitudinal bore 68 between the stop 142 and the second actuating piston 134. In this manner, while hydraulic fluid introduced into the first entrance bore 70 will operate to move the column of pistons and gates from the first position to the second position, the spring 174 will function to return the column to the first position when the hydraulic fluid is removed from the first entrance bore 70. In this example, the second entrance bore 72 may be employed as a fluid compensation port. Alternatively, the mechanical biasing means could be replaced with an electromagnetic biasing means. In yet another variation, a conventional valve actuator having a stem which engages the column through a bore in the body 06 could be employed to move the column between the first and second positions. Other variations may be readily derived by those skilled in the art.

Figure 5:
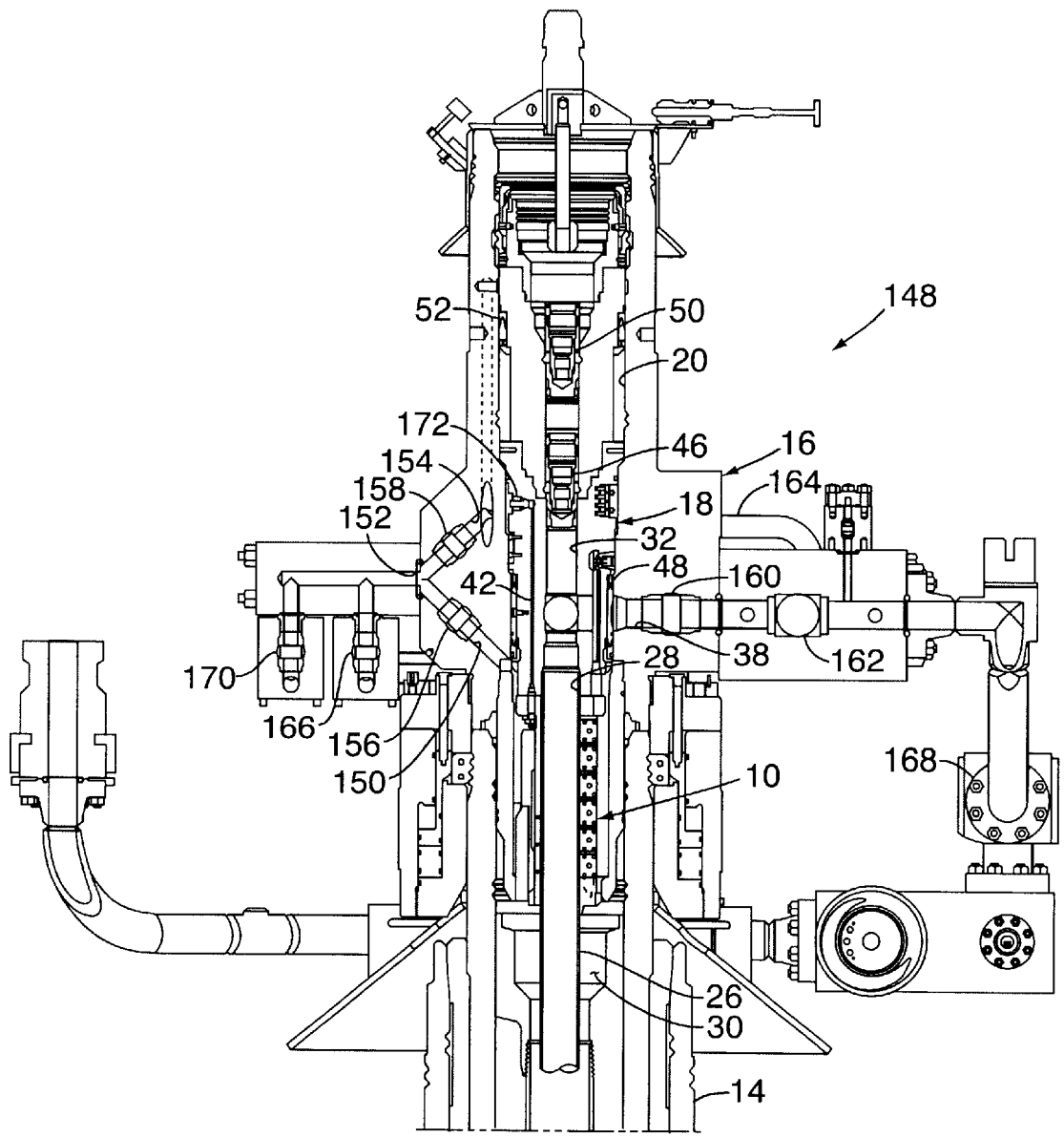
FIG. 5 is a diagrammatic representation of a second exemplary flow completion system showing the multiport gate valve assembly of the present invention installed on the tubing hanger component of the system.

Another embodiment of a flow completion system with which the multiport gate valve assembly 10 may be particularly useful is illustrated in FIG. 5. The flow completion system of this embodiment, which is indicated generally by reference number 148, is similar in many respects to the flow completion system 12. However, the flow completion system 148 does not include an annulus bore 36 extending through the tubing hanger 18. Rather, the flow completion system 148 comprises an annulus passageway 150 which extends through the tubing spool 16 from the tubing annulus 30 to an annulus outlet 152, a workover passageway 154 which extends through the tubing spool from the annulus passageway 150 to a portion of the central bore 20 located above the second seal 52, a closure member 156, such as a remotely operable gate valve, for controlling flow through the annulus passageway 150, and a closure member 158, such as a remotely operable gate valve, for controlling flow through the workover passageway 154. In this manner, fluid communication may be established between the tubing annulus 30 and the portion of the central bore 20 located above the second seal 52 through the annulus passageway 150 and the workover passageway 154.

Furthermore, the production outlet 38 is preferably connected to the annulus outlet 152 through a production master valve 160, a production wing valve 162, a crossover line 164 and a crossover valve 166. In addition, a production shutdown valve 168 may be connected to the production outlet 38 outboard of the crossover line 164, and an annulus wing valve 170 may be connected to the annulus and workover passageways 150, 154 outboard of the crossover valve 166. In this manner, several fluid circulation paths may be established between the production bore 32 and the tubing annulus 30 through the annulus and workover passageways 150, 154 and the crossover line 164, as is readily understood by those of skill in the art. Moreover, these valve and flow conduit interface positions may be changed to suit case-specific requirements.

As in the flow completion system 12, the tubing hanger 18 of the flow completion system 148 comprises both of the industry standard first and the second barriers between the well bore and the environment. Thus, while a poppet-type valve 172 is mounted in each service and control conduit 42 to provide a first barrier, the multiport gate valve assembly 10 is connected to the service and control conduits as described above to provide the second barrier.

Although not depicted in the drawings, another flow completion system with which the use of the multiport gate valve assembly 10 may prove advantageous is the horizontal-type flow completion system. This system is similar in many respects to the flow completion system 148. However, in the horizontal-type flow completion system, the tubing hanger comprises only a single closure member positioned in the production bore and a single annular seal disposed between the tubing hanger and the tubing spool. The second barrier between the well bore and the environment is accordingly provided by a tree cap, which typically includes an axial though bore which is sealed by a second closure member and an annular seal which is positioned between the tree cap and the tubing spool. Since the horizontal-type flow completion system also may include one or more service and control conduits extending through the tubing hanger, the multiport gate valve assembly 10 can provide a compact and effective barrier for such conduits.

Thus, it may be seen that the multiport gate valve assembly 10 provides a simple and effective means for controlling the flow of fluid through multiple flow paths. Furthermore, while the gate valve assembly 10 in effect comprises a number of individual gate valves, all of the gate valves may be actuated simultaneously by a single actuating mechanism comprising a single set of control lines. In the context of a flow completion system, therefore, the gate valve assembly provides an effective second barrier between the well bore and the environment through the service and control conduits 42 without unduly increasing the cost or complexity of the flow completion system. Finally, although the multiport gate valve assembly 10 has been illustrated and described in the context of certain exemplary flow completion systems 12, 148, it should be understood that the gate valve assembly could be used in any application requiring the control of fluid flow through multiple individual flow paths.

It should be recognized that, while the present invention has been described in relation to the preferred embodiments thereof, those skilled in the art may develop a wide variation of structural and operational details without departing from the principles of the invention. For example, the various elements illustrated in the different embodiments may be combined in a manner not illustrated above. Therefore, the appended claims are to be construed to cover all equivalents falling within the true scope and spirit of the invention.

What is claimed is:

1. A gate valve assembly which comprises:
   an elongated body having a longitudinal bore extending therethrough;
   a plurality of gates slidably disposed in the longitudinal bore across respective flow passages which each extend laterally through the body between corresponding inlet and outlet ports;
   each gate being movable between an open position wherein an opening in the gate is aligned with its respective flow passage and a closed position wherein the opening is offset from its respective flow passage;
   actuator means for moving the gates simultaneously between a first position, wherein at least one of the gates is in its open position, and a second position, wherein the at least one gate is in its closed position;
   each gate being disposed between first and second seats, each of which comprises a through bore that aligns with the flow passage;
   the first seat being positioned between the body and the gate; and
   the second seat being rigidly attached to a plug member which is secured over a transverse bore that is formed in the body concentrically with the flow passage.

2. The gate valve assembly of claim 1, wherein:
   the body comprises first and second entrance bores which communicate with respective ends of the longitudinal bore; and
   the actuator means comprises a first piston which is disposed in the longitudinal bore between the first entrance bore and the gates, a source of hydraulic fluid which is connectable to the first entrance bore to move the gates from the first position to the second position, and means for returning the gates from the second position to the first position.

3. The gate valve assembly of claim 2, wherein the returning means comprises a second piston which is disposed in the longitudinal bore between the second entrance bore and the gates and a source of hydraulic fluid which is connectable to the second entrance bore.

4. The gate valve assembly of claim 2, wherein the returning means comprises a spring which is disposed in the longitudinal bore between the gates and an end of the longitudinal bore opposite the first entrance bore.

5. A valve assembly which comprises:
   an elongated body having first and second spaced apart entrance bores and a longitudinal bore extending between the entrance bores;
   a plurality of gates positioned in the longitudinal bore;
   each gate being slidably disposed across a respective flow passage which extends between a corresponding inlet port and a corresponding outlet port;
   each gate comprising an opening and being movable between an open position wherein the opening is aligned with its respective flow passage and a closed position wherein the opening is offset from its respective flow passage;
   a first piston positioned in the longitudinal bore between the first entrance bore and the gates;
   a second piston positioned in the longitudinal bore between the second entrance bore and the gates; and
   a source of hydraulic fluid connected to each of the first and second entrance bores;

wherein application of hydraulic fluid to the first entrance bore will move the first piston and the gates from a first position to a second position, and application of hydraulic fluid to the second entrance bore will move the second piston and the gates from the second position to the first position;

wherein the first position corresponds to at least one of the gates being in the open position and the second position corresponds to the at least one gate being in the closed position.

each gate is disposed between first and second seats, each of which comprises a through bore that aligns with the flow passge;

the first seat is positioned between the body and the gate; and the second seat is attached to a plug member which is secured over a transverse bore that is formed in the body concentrically with the flow passage.

\* \* \* \* \*